US012534925B2

(12) United States Patent
McFarland

(10) Patent No.: US 12,534,925 B2
(45) Date of Patent: Jan. 27, 2026

(54) LOW FREQUENCY NOISE REDUCTION METHODS AND DEVICES

(71) Applicant: American Wave Machines, Inc., Solana Beach, CA (US)

(72) Inventor: Bruce McFarland, Solana Beach, CA (US)

(73) Assignee: American Wave Machines, Inc., Solana Beach, CA (US)

( * ) Notice: Subject to any disclaimer, the term of this patent is extended or adjusted under 35 U.S.C. 154(b) by 0 days.

(21) Appl. No.: 18/888,116

(22) Filed: Sep. 17, 2024

(65) Prior Publication Data

US 2025/0092700 A1 Mar. 20, 2025

Related U.S. Application Data

(60) Provisional application No. 63/539,415, filed on Sep. 20, 2023.

(51) Int. Cl.
*E04H 4/00* (2006.01)
*F15B 21/00* (2006.01)

(52) U.S. Cl.
CPC ......... *E04H 4/0006* (2013.01); *F15B 21/008* (2013.01)

(58) Field of Classification Search
CPC .. E04H 4/0006; F15B 21/008; A63B 69/0093
USPC .......................................... 4/491; 405/52, 79
See application file for complete search history.

(56) References Cited

U.S. PATENT DOCUMENTS

| | | | | |
|---|---|---|---|---|
| 4,276,661 A * | 7/1981 | Baker | E04H 4/0006 4/491 |
| 5,226,747 A | 7/1993 | Wang | |
| 10,738,492 B1 * | 8/2020 | McFarland | E04H 4/0006 |
| 11,891,834 B2 * | 2/2024 | Ginestet | E04H 4/0006 |
| 12,247,413 B2 * | 3/2025 | Ginestet | E04H 4/0006 |
| 2010/0158611 A1 * | 6/2010 | Demarteau | E04H 4/0006 405/79 |
| 2020/0277802 A1 | 9/2020 | McFarland | |
| 2022/0290455 A1 | 9/2022 | Ginestet et al. | |
| 2024/0133198 A1 * | 4/2024 | Ginestet | E04H 4/0006 |
| 2024/0191526 A1 * | 6/2024 | Ginestet | E04H 4/0006 |

OTHER PUBLICATIONS

International Search Report for PCT/US2024/047123 Dated Dec. 5, 2024 (14 Pages).
Li et al. "Optimization of valve opening process for the suppression of impulse exhaust noise." Journal of Sound and Vibration 389 (2017): 24-40 (17 Pages).

* cited by examiner

*Primary Examiner* — Erin Deery
*Assistant Examiner* — William R Klotz
(74) *Attorney, Agent, or Firm* — Manuel de la Cerra

(57) ABSTRACT

Various improvements for mitigating low-frequency noise (LFN) in a wave making apparatuses are disclosed. These improvements use a variety of structures to mitigate LFN formation emanating from the rapid depressurization of the chambers during the release water into a pool. The improvements include a variable pressure relief/exhaust valve opening speeds, a pressure relief slit on the exhaust port, a secondary pressure relief/exhaust valve, an active absorption panel and a passive absorption panel. Each of these improvements may be used alone or in combination with each other.

13 Claims, 19 Drawing Sheets

(Valve Closed)

(Valve Initial Opening )

LOW FREQUENCY NOISE REDUCTION METHODS AND DEVICES

TECHNICAL FIELD

The present invention relates generally to a wave forming apparatus and, specifically to pneumatic wave-generating chambers.

RELATED APPLICATIONS

This application is related to 63/539,415 title "Low Frequency Noise Reduction Methods and Devices" filed on Sep. 20, 2023, the entire contents of which are incorporated herein by reference.

BACKGROUND OF THE INVENTION

Previous disclosures by the present inventor have included an aquatic sports amusement apparatus that includes a pool, a plurality of wave-generating chambers that release water into a pool, and a mobile application controller that operates the chambers, such that each chamber in the plurality releases water to create waves. The controller can be connected to the plurality of chambers via a network connection; such a connection could include a local area network, a wireless network, the internet and/or a virtual private network. The controller could be located at a distant location from the pool and chamber complex, and the controller may be a smart phone, a personal computer, a personal digital assistant, a laptop and/or a tablet computer. Those disclosures can be found in U.S. Ser. No. 16/149,051 filed on Oct. 1, 2018, which is a continuation of U.S. Ser. No. 14/808,076 filed on Jan. 27, 2016, which is a divisional of U.S. Ser. No. 13/740,419 filed on Jan. 14, 2013, which is the non-provisional of U.S. Ser. No. 61/721,304 filed on Nov. 1, 2012, all of which are by the same inventor, and all of which are incorporated herein by reference in their totality.

The release of the water from the chambers may be performed by manipulating the air pressure in the chambers as disclosed in detail in the patent applications listed above. During implementation, however, when the valve first opens to release air pressure from the wave-generating chambers, a low-frequency noise (LFN) may be emitting. Unlike high-frequency noise, LFN is difficult to baffle and otherwise mute. It travels more easily though the structures and can cause an unpleasant sound during operation, and can cause shaking in nearby structures such as doors, windows, and walls. LFN has also been associated with human discomfort What is needed therefore is a system that overcomes these drawbacks.

SUMMARY OF THE INVENTION

An improvement for mitigating low-frequency noise (LFN) in a wave making apparatus with a chamber constructed to release water into a pool. The chamber includes a pressure relief/exhaust valve having a valve blade/flap constructed to regulate air flow from the interior of the chamber to the exterior of the chamber. The chamber may include an actuator connected to the pressure relief/exhaust valve and an actuator speed controller connected to the actuator. The actuator speed controller has a first opening speed and a second opening speed. The first opening speed is less than the second opening speed, and is implemented at the initial opening of the pressure relief/exhaust valve for a period. The period is selected to mitigate the formation of LFN caused by the air flow through the pressure relief/exhaust valve.

The actuator may comprise a valve blade/flap stroke percentage (VS %), and the first opening speed is defined by (ΔVS %)1/second, while the second opening speed is defined by (ΔVS %)2/second.

Another improvement includes a pressure relief port providing a conduit for the air flow in a first direction. This port includes a pressure relief slit allowing airflow in a second direction perpendicular to the first direction. The pressure relief slit is positioned adjacent to the valve blade/flap such that the valve blade/flap directs the air flow through the pressure relief slit during the initial opening of the pressure relief/exhaust valve.

In yet another improvement, a secondary pressure relief/exhaust valve is constructed to regulate a second air flow from the interior of the chamber to the exterior of the chamber. A second actuator is connected to the secondary pressure relief/exhaust valve and the speed controller. The actuator speed controller begins opening the secondary pressure/exhaust relief valve before the actuator speed controller begins opening the pressure relief/exhaust valve. The pressure relief/exhaust valve comprises a first maximum air flow rate and the secondary pressure relief/exhaust valve comprises a second maximum air flow rate that is less than half of the first maximum airflow rate.

In yet another improvement, an active LFN panel is positioned adjacent to the pressure relief/exhaust valve. The active LFN panel includes a panel actuator that vibrates the active LFN panel at a frequency to mitigate the formation of LFN through destructive interference. The vibration frequency may be determined in real time or based on an average of LFN frequencies produced by the wave making apparatus.

In a final improvement, a tuned LFN absorption panel is positioned adjacent to the pressure relief/exhaust valve. The tuned LFN absorption panel comprises a panel damper that is selected to absorb the expected LFN frequencies. The panel damper may be adjustable to change the frequency the tuned LFN absorption panel will absorb.

Each of these improvements may be used alone to mitigate LFN formation, or may be used in combination with each other.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1A:
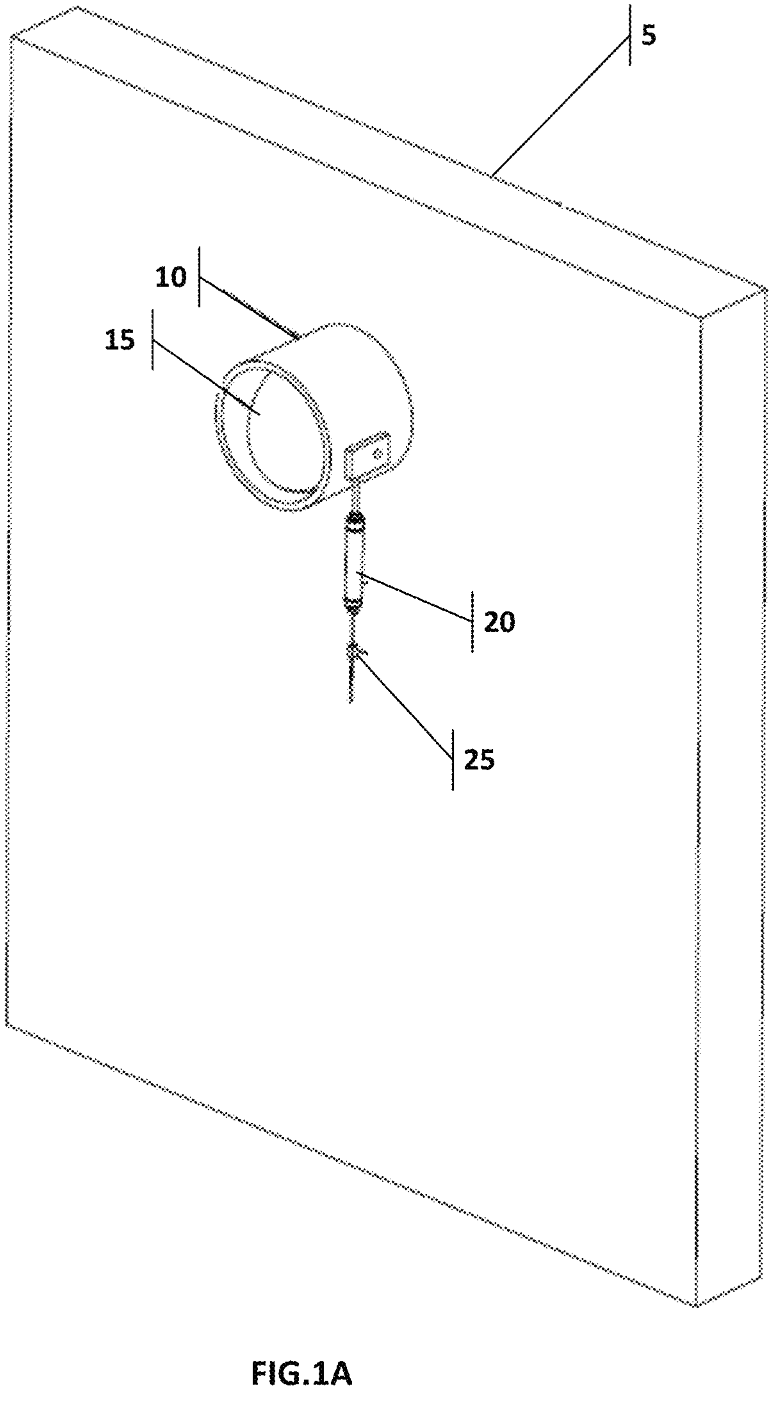
FIG. 1A is an isometric view of a pressure relief/exhaust valve mounted to a chamber wall, and connected to a speed controller to reduce low-frequency noise (LFN).
Figure 1B:
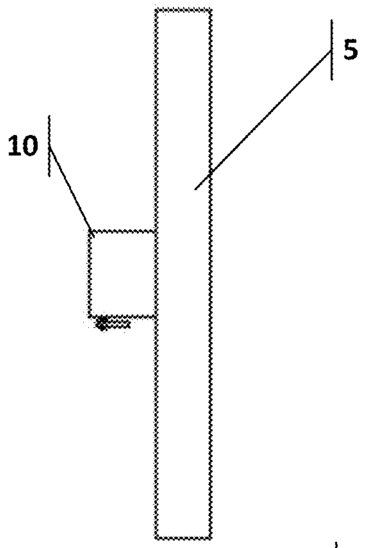
FIG. 1B is a top view of the structure of FIG. 1A.
Figure 1C:
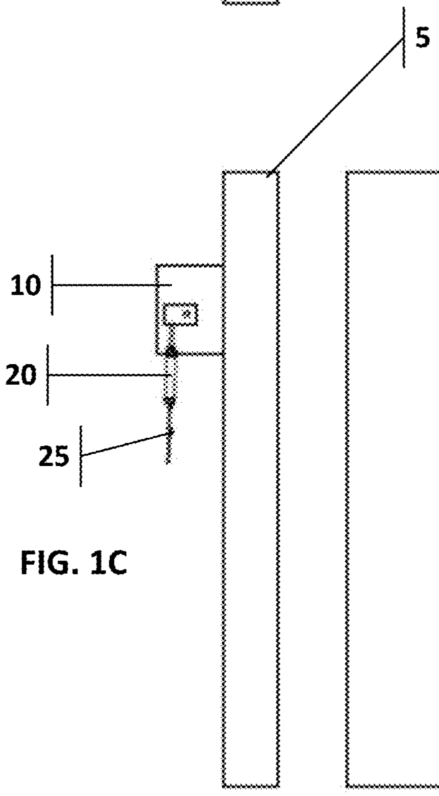
FIG. 1C is a side view of the structure of FIG. 1A.
Figure 1D:
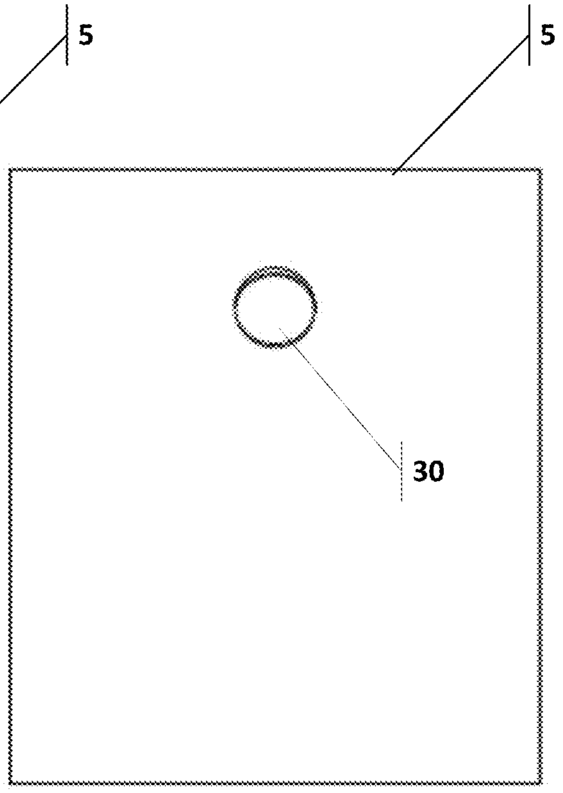
FIG. 1D is a back view of the structure of FIG. 1A.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

| | |
|---|---|
| Chamber Wall | 5 |
| Pressure Relief/Exhaust Valve | 10 |
| Valve Blade/Flap | 15 |
| Valve Blade Actuator | 20 |
| Actuator Speed Controller | 25 |
| Regulated Opening Curve | 25A |
| Regulated Opening Curve | 25B |
| First Opening Speed | 26 |
| Second Opening Speed | 27 |
| Chamber Pressure Relief Port | 30 |
| Pressure Relief Slit | 35 |
| Secondary Pressure Relief/Exhaust Valve | 40 |
| Second Actuator | 42 |
| Chamber Secondary Pressure Relief Port | 45 |
| Pressure Relief Valve (with or without LFN reduction structures) | 50 |
| Active LFN Panel | 55 |
| Panel Actuator | 60 |
| LFN Absorption Tuned Panel | 65 |
| Panel Dampers | 70 |
| Fan | 110 |
| Plenum | 115 |
| Chamber | 120 |
| Pool | 125 |
| Vent Valve | 135 |
| Pressure Sensor | 137 |
| Inlet Valve | 140 |
| Fan Outlet Nozzle | 145 |
| Fan Outlet Damper | 150 |
| Fan Inlet Damper | 155 |
| Fan Inlet Filter | 160 |
| Fan Inlet Isolator | 165 |
| Fan Inlet Flow Conditioner | 170 |

Figure 6:
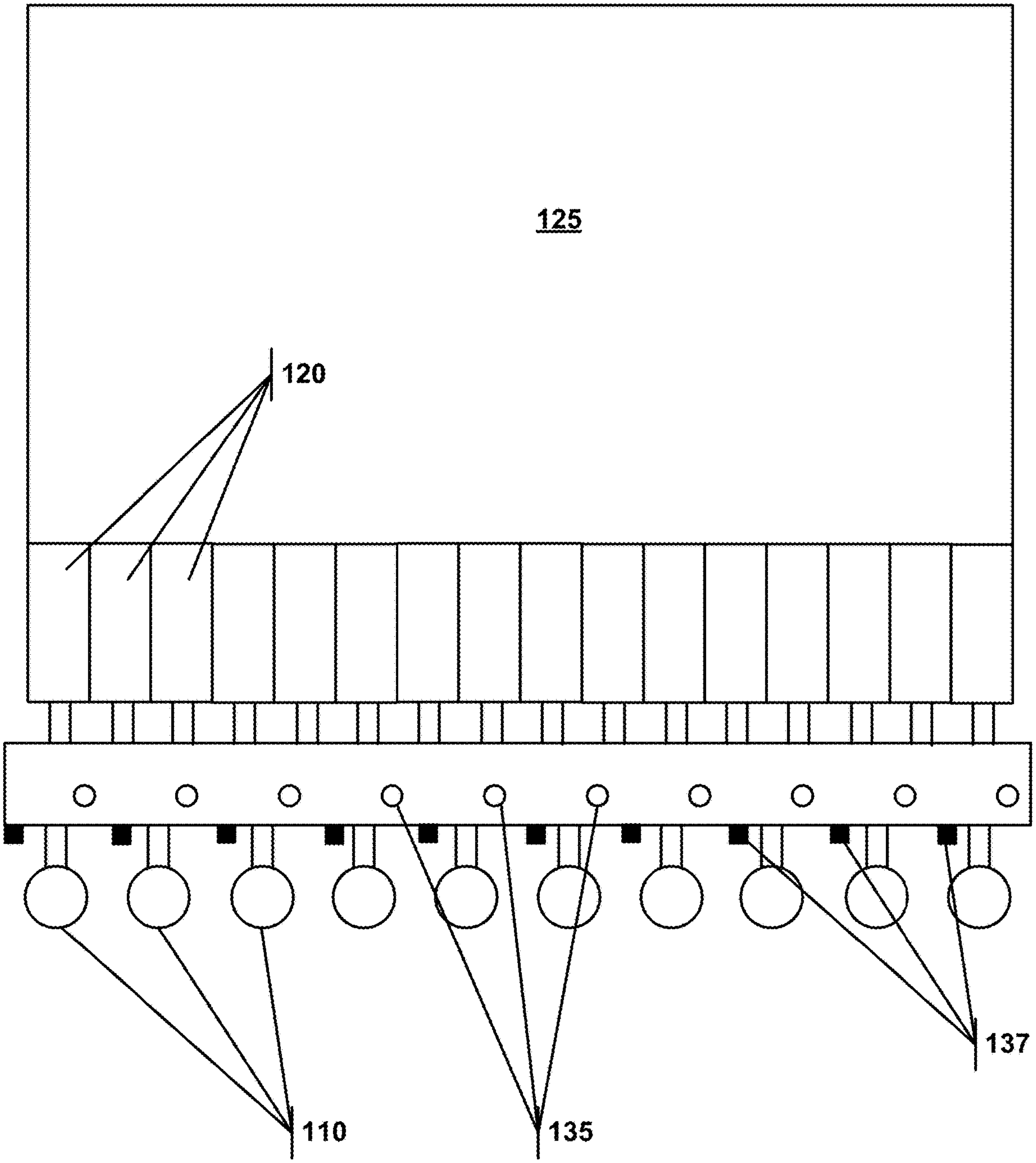
FIG. 6 is a top view of a wave making apparatus with a plurality of chambers.

To create the air pressure needed to actuate the wave making chambers described in the patent applications listed above, several fans should be used. Such an aquatic sports amusement apparatus is shown in FIG. 6, with ten fans 110 jetting air into a plenum 115, and that pressurized air is made available to the wave making chambers 120, which can then release water into the pool 125. The plenum 115 may be a single volume that is maintained a near constant pressure. The benefit of a single plenum 115 is that it will substantially equalize from the plurality of fans 110 the pressure making control of the apparatus more reliable and robust. Also, should one fan fail or decrease in performance, the apparatus can continue operation by relying on the pressure creation from the other fans. While a single plenum 115 is shown in FIG. 6, it would be apparent that more plenums may be used. For example, two to five fans 110 may share a single plenum 115.

But the pressure within the plenum is not uniform in all portions of the plenum; indeed fluctuation of greater than 5 inches of water have been measured within an operational plenum. Therefore, fans 110 connected to particular portions of the plenum 115 may be more susceptible to going unstable. Using multiple pressure sensors 137 and vents 135, wherein each sensor 137 and vent 140 is located near each fan 110 is a way to account for the variations in the plenum 115 and more effective abate fan instability. Correcting this instability is disclosed in more detail in U.S. Pat. No. 10,738,492 issued to the same inventor as the present application, which is also incorporated herein by reference in its totality.

Figures 7A, 7B:
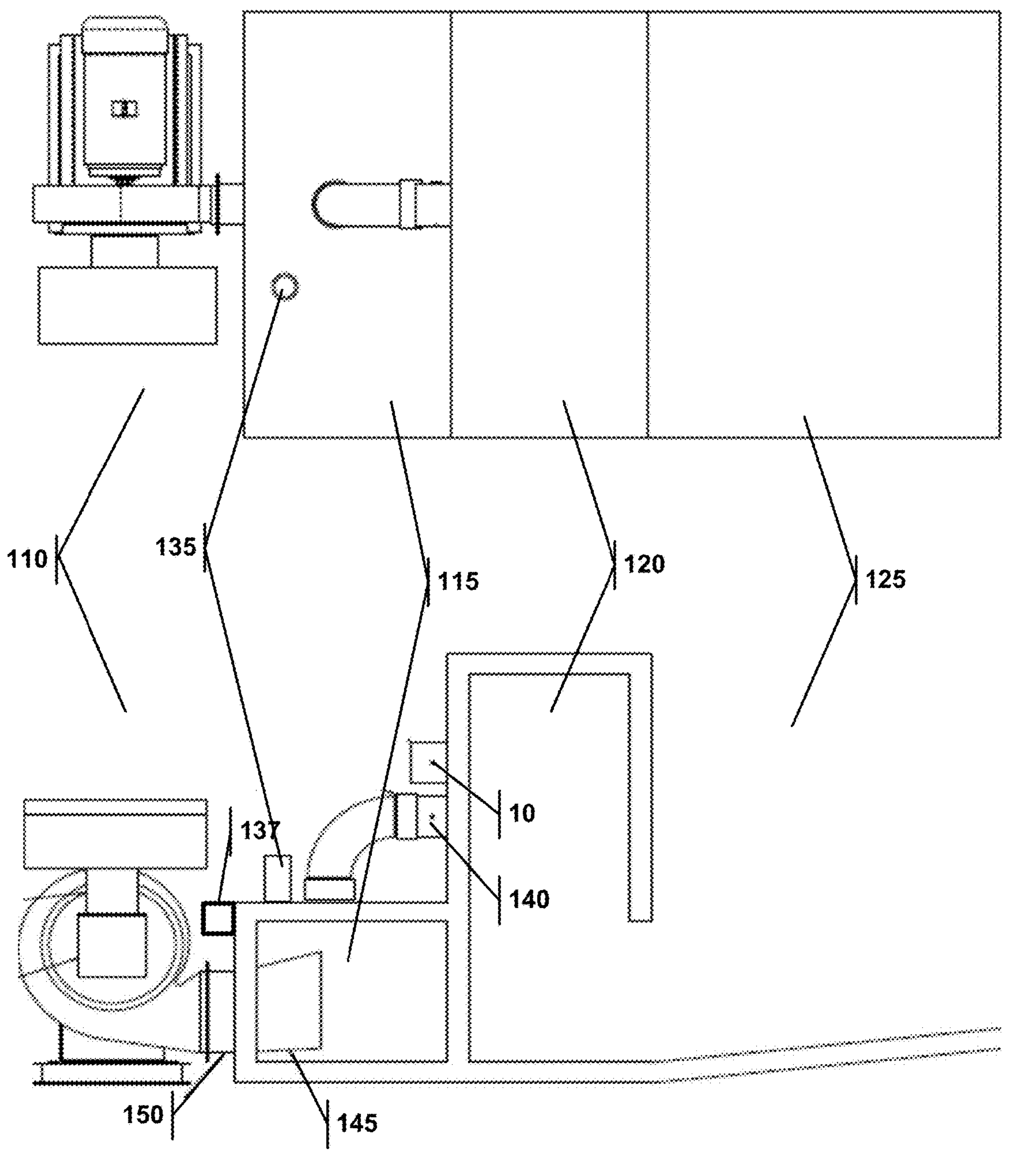
FIG. 7A is a top view of a single fan connected to a single chamber.
FIG. 7B is a side cross-section view of FIG. 7A.

FIG. 7A is a top view of a single fan 110 connected to a single chamber 120 that releases water into the pool 125. A vent valve 135 may vent air pressure to atmosphere. FIG. 7B is a side cross-section view of FIG. 7A, showing the pressure sensor 137. This view also shows additional structures including an pressure relief/exhaust valve 10, inlet valve 140, fan outlet nozzle 145, fan outlet damper 150, fan inlet damper 155, fan inlet filter 160, fan inlet isolator 165, and fan inlet flow conditioner 170. Importantly and as discussed in more detail below, the improvements disclosed herein relate to the pressure relief/exhaust valve 10.

In operations the fan 110 charges the plenum 115 with pressurized air that may be introduced to the chamber 120 through inlet valve 140. The pressurized air forces water out of the chamber 120 into the pool 125. The pressure relief/exhaust valve 10 may be actuated to release the air pressure in the chamber 120, allowing water to flow back into the chamber 120 from the pool 125. This movement of water into and out of the chamber creates waves in the pool 125. The valves may be timed such that the chamber 120 may be operated independently of the other chambers 120 in array of chambers. The details of this operation are disclosed in detail in the applications cited above, and is not repeated here.

When the pressure relief/exhaust valve 10 is first opened, it releases a tremendous amount of pressure that generates a loud LFN. Given that several of the relief/exhaust valves 10 are opened in close succession during the operation of the wave-generating device, the LFN is amplified and may cause a nuisance. This is particularly pernicious and troublesome when the wave-generating device is located in a populated area.

Figure 1E:
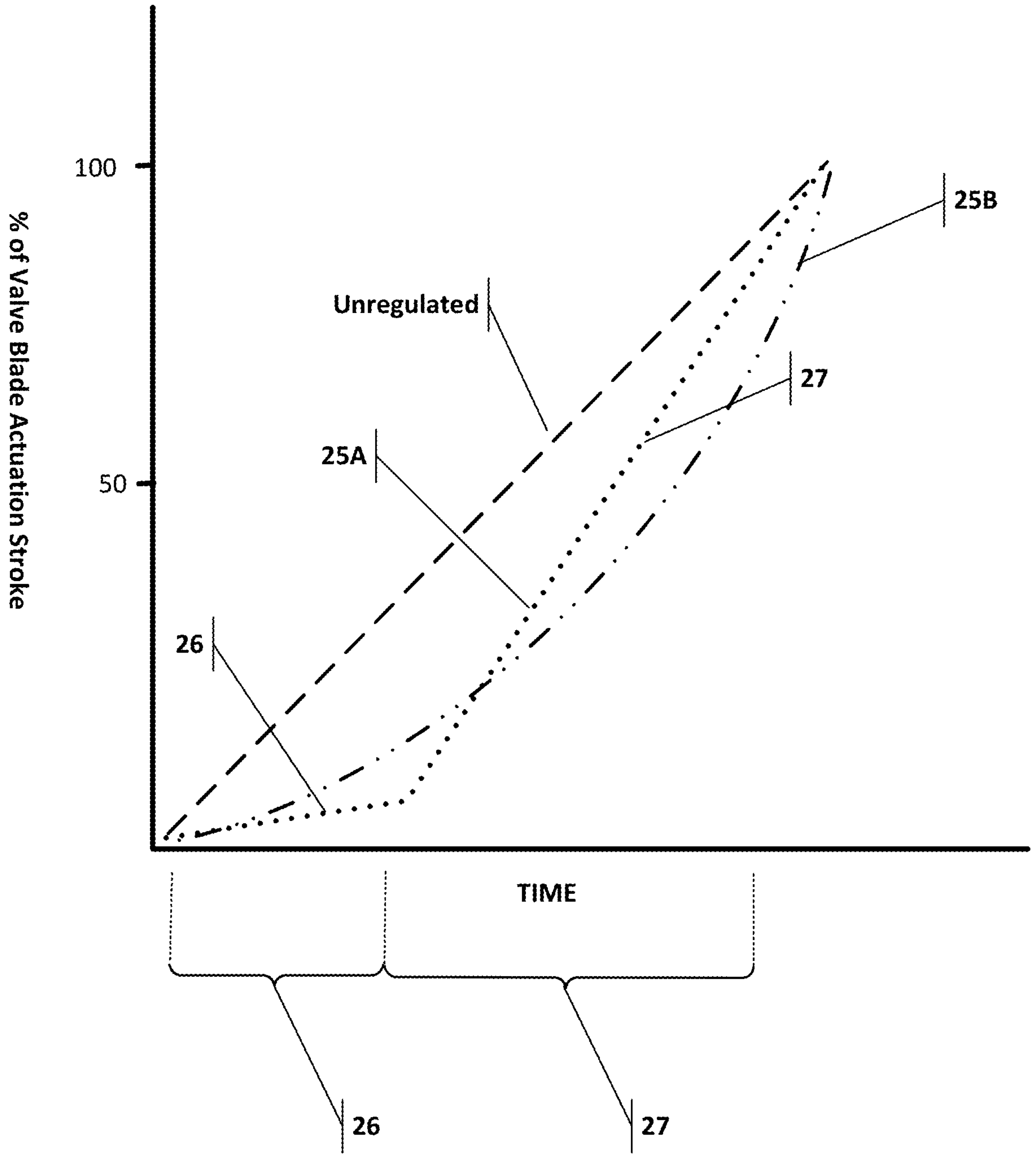
FIG. 1E is a graph showing preferred actuator timings compared to an unregulated timing.

Disclosed herein are several devices directed at mitigating LFN production. Referencing FIG. 1A-1D, a pressure relief/exhaust valve 10 is connected to the interior of a wave making chamber through a chamber wall 5. The pressure relief/exhaust valve 10 includes a valve blade/flap 15 connected to an actuator 20 that rotates the valve blade/flap 15, opening the pressure relief/exhaust valve 10. If the actuator is opened quickly, the sudden rush of existing air emits a loud LFN. By introducing an actuator speed controller 25 to regulate the actuator speed (and thus the pressure relief/exhaust valve 10 open speed), LFN formation can be mitigated. Specifically, it has been discovered that opening the valve blade/flap 15 initially for a minor amount to allow the air pressure within the chamber to decrease without emitting a loud LFN, followed by a more rapid valve opening to full release the air pressure in the chamber. Shown in FIG. 1E is a graph showing one embodiment of the actuator timing compared to the unregulated timing. The lower regulated curves (25A, 25B) open the valve blade slowly at first and then increases the opening speed. The initial slow opening bleeds the pressure sufficient to allow the complete opening without LFN formation. In other words, speed controller 25 has at least a first opening speed 26 and a second opening speed 27, with the first opening speed 26 being less than the second opening speed 27. The first opening speed 26 is implemented at the initial opening of the pressure relief/exhaust valve 10 for a period. This period is selected to mitigate the formation of LFN caused by the air flow through the pressure relief/exhaust valve 10.

As shown in FIG. 1E, the lower curve 25A has a first opening speed 26 and a second opening speed 27, each of which can be defined by the slope of the line—i.e., a valve blade/flap stroke percentage (VS %)/time. The other curve 25B also has a slower first opening speed range 26 followed by a faster second opening speed range 27, but in this curve 25B unlike curve 25A, the opening speed varies throughout the curve without an abrupt speed change.

Figure 2A:
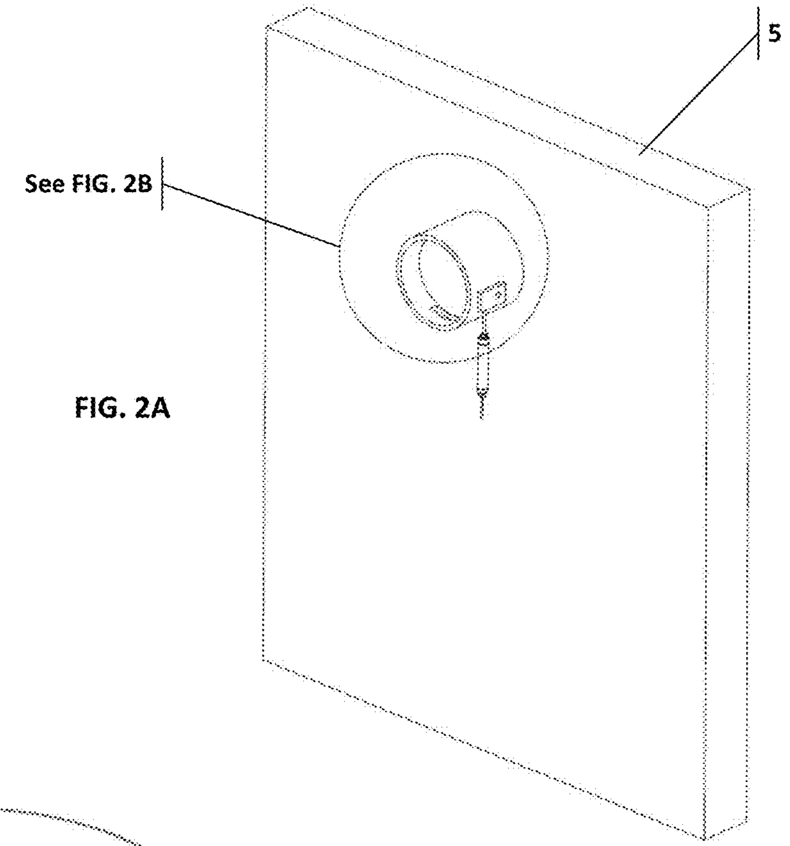
FIG. 2A is an isometric view of pressure relief/exhaust valve, with a pressure relief port, mounted to a chamber wall to reduce LFN.
Figure 2B:
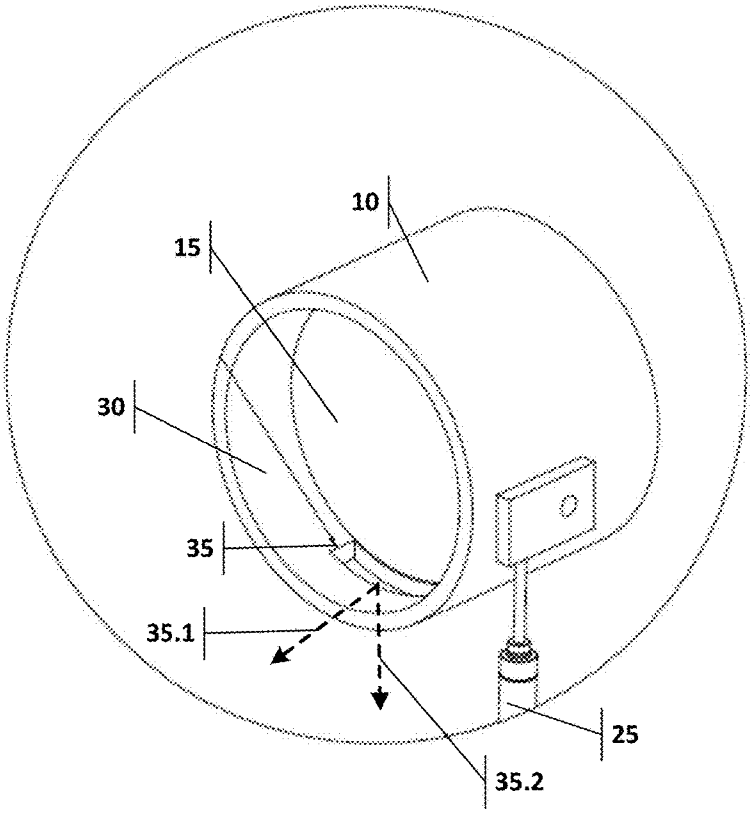
FIG. 2B is an enlarge view of the pressure relief/exhaust valve of FIG. 2A.
Figure 2C:
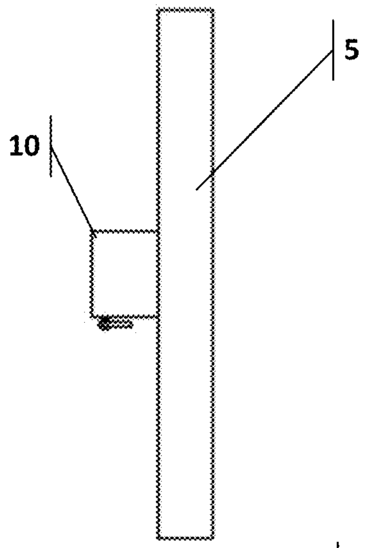
FIG. 2C is a top view of the structure of FIG. 2A.
Figure 2D:
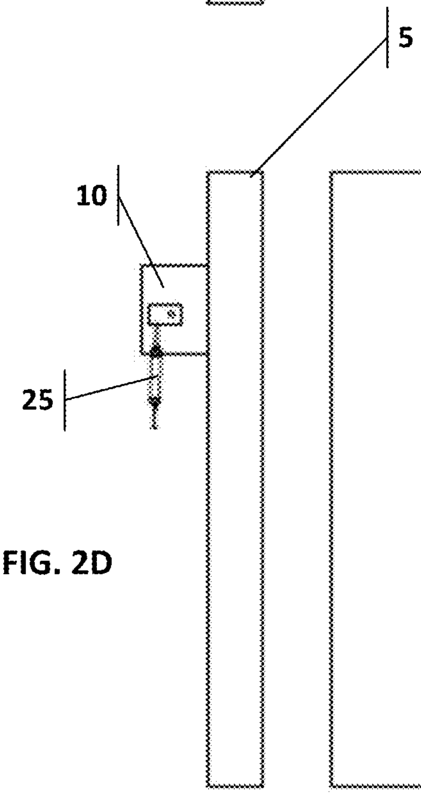
FIG. 2D is a side view of the structure of FIG. 2A.
Figure 2E:
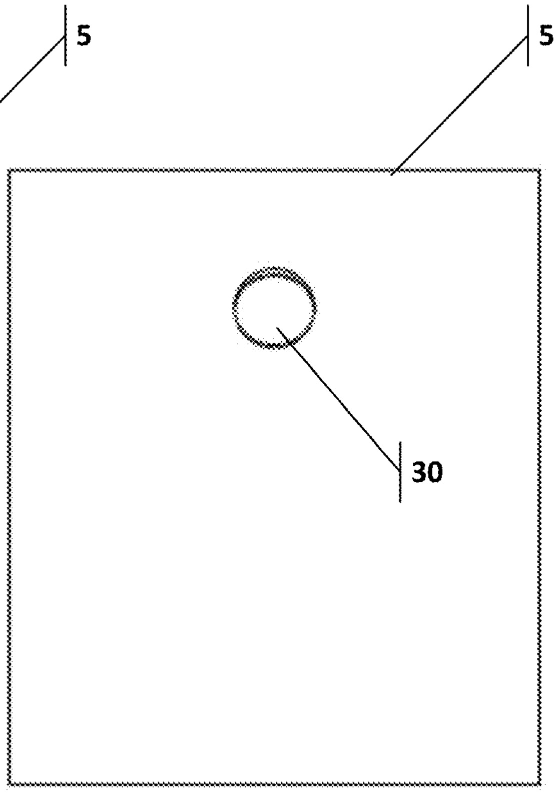
FIG. 2E is a back view of the structure of FIG. 2A.
Figure 2F:
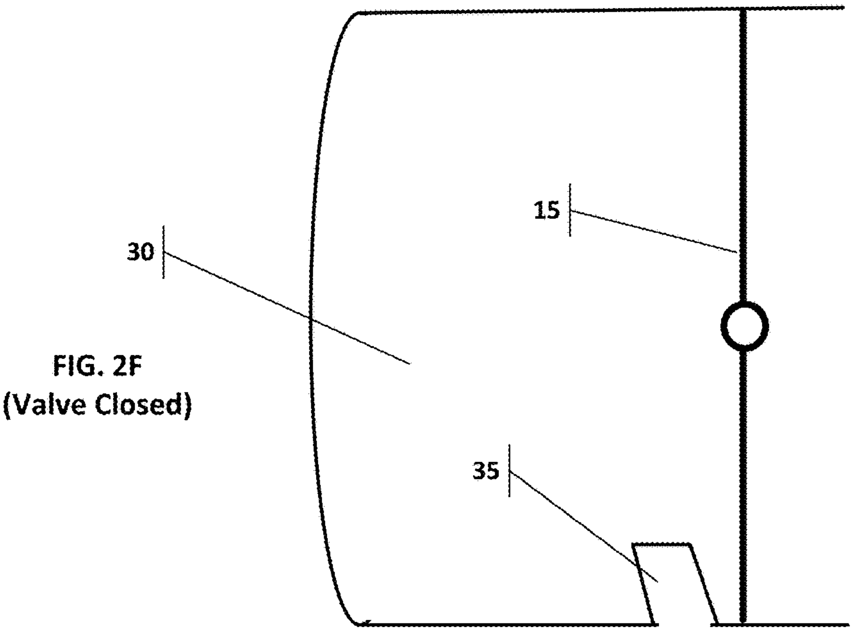
FIG. 2F is a cross-sectional view of the FIG. 2A in a closed position.
Figure 2G:
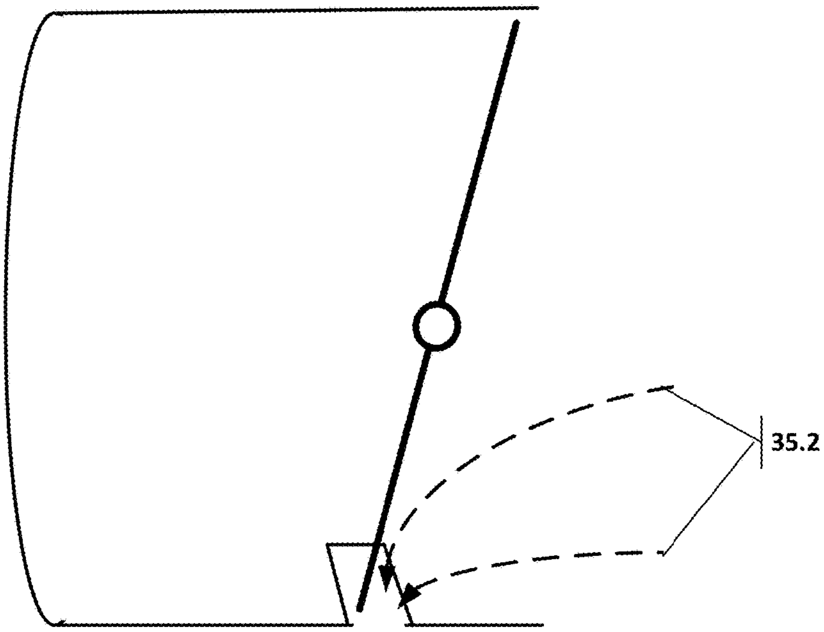
FIG. 2G is a cross-sectional view of the FIG. 2A in an initial opened position.
Figure 3A:
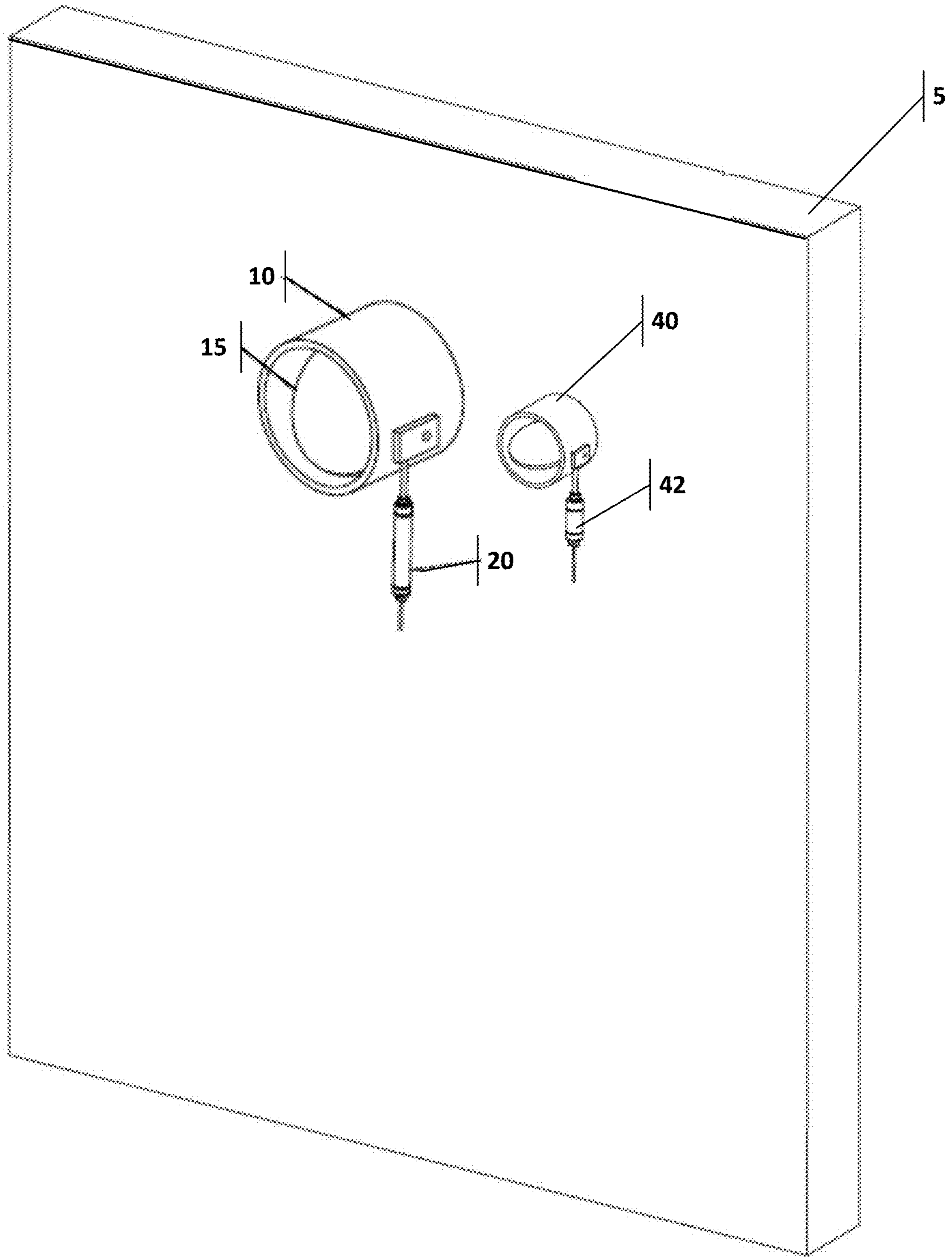
FIG. 3A is an isometric view of a pressure relief/exhaust valve and secondary pressure relief/exhaust valve mounted to a chamber wall to reduce LFN.
Figure 3B:
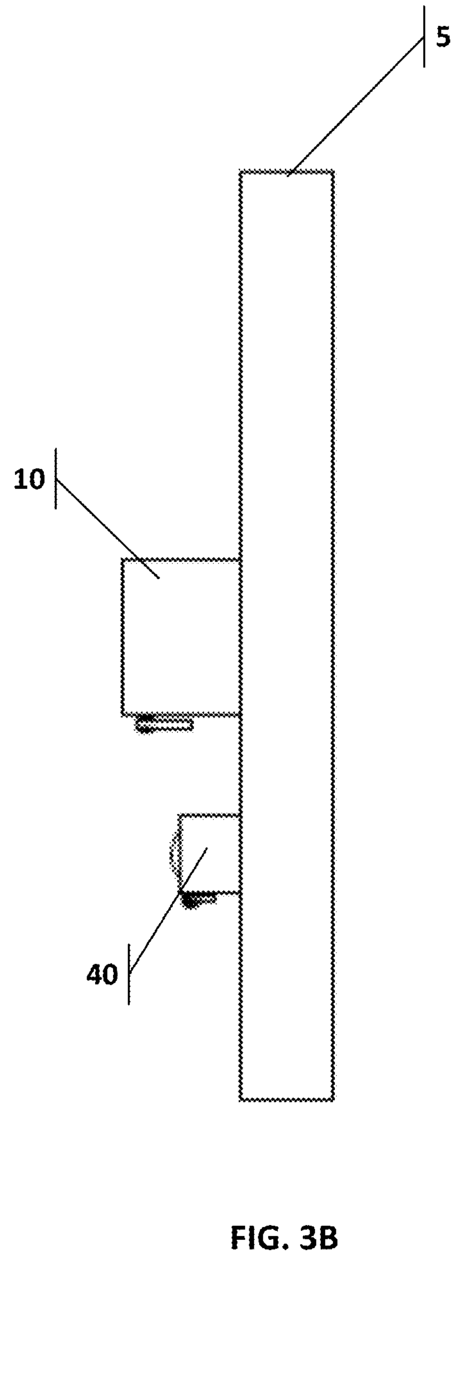
FIG. 3B is a top view of the structure of FIG. 3A.
Figure 3C:
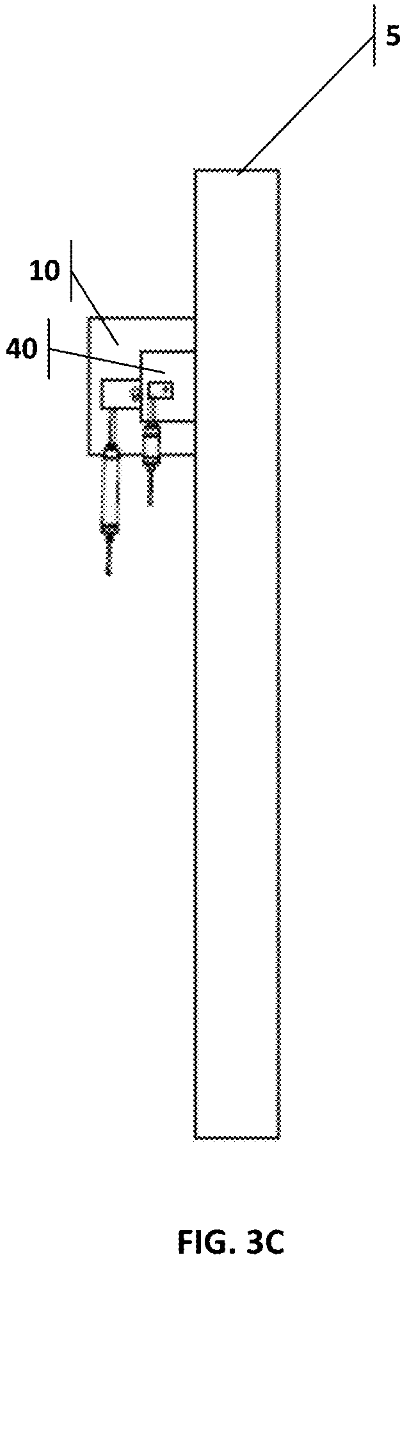
FIG. 3C is a side view of the structure of FIG. 3A.
Figure 3D:
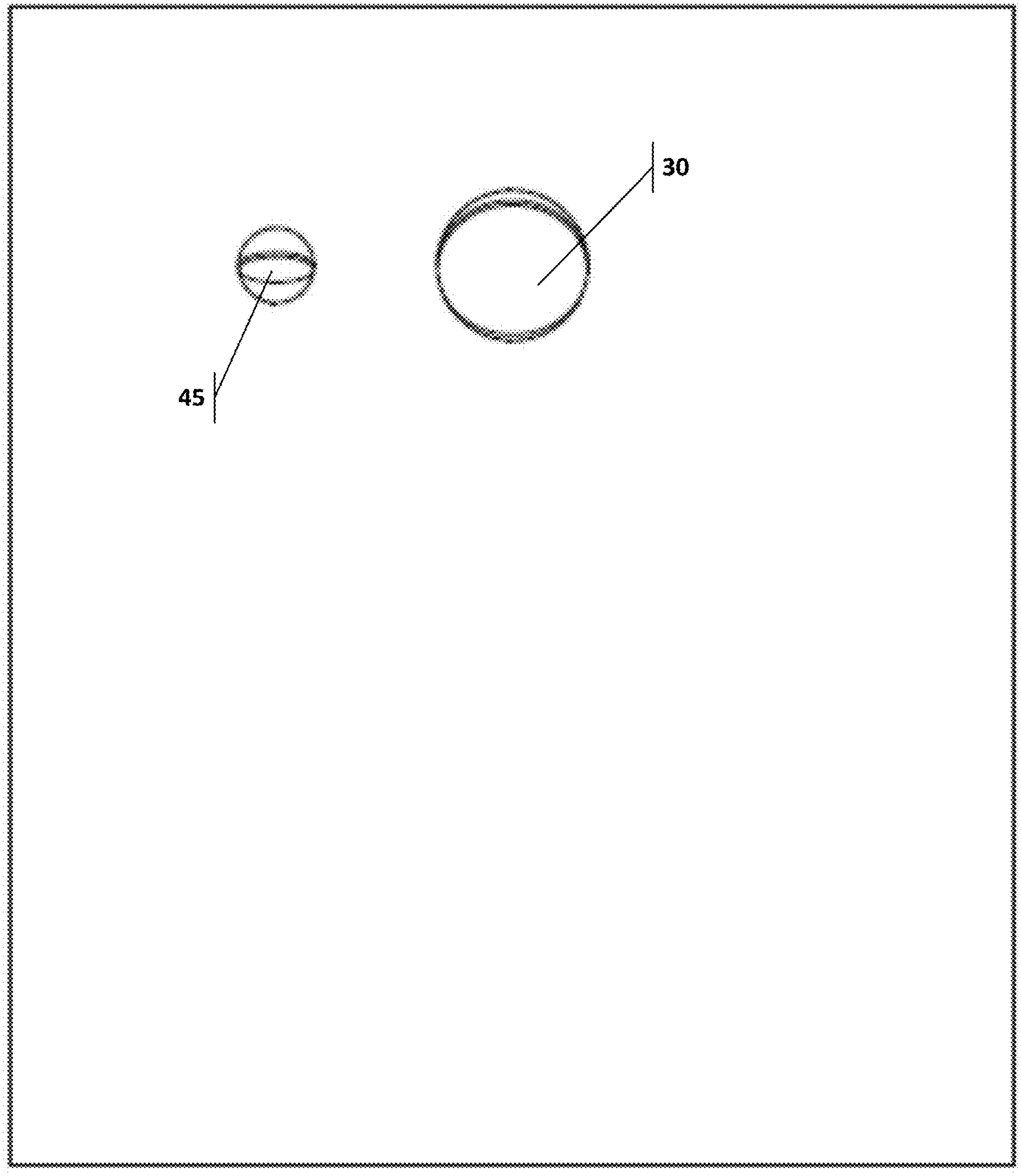
FIG. 3D is a back view of the structure of FIG. 3A.
Figure 4A:
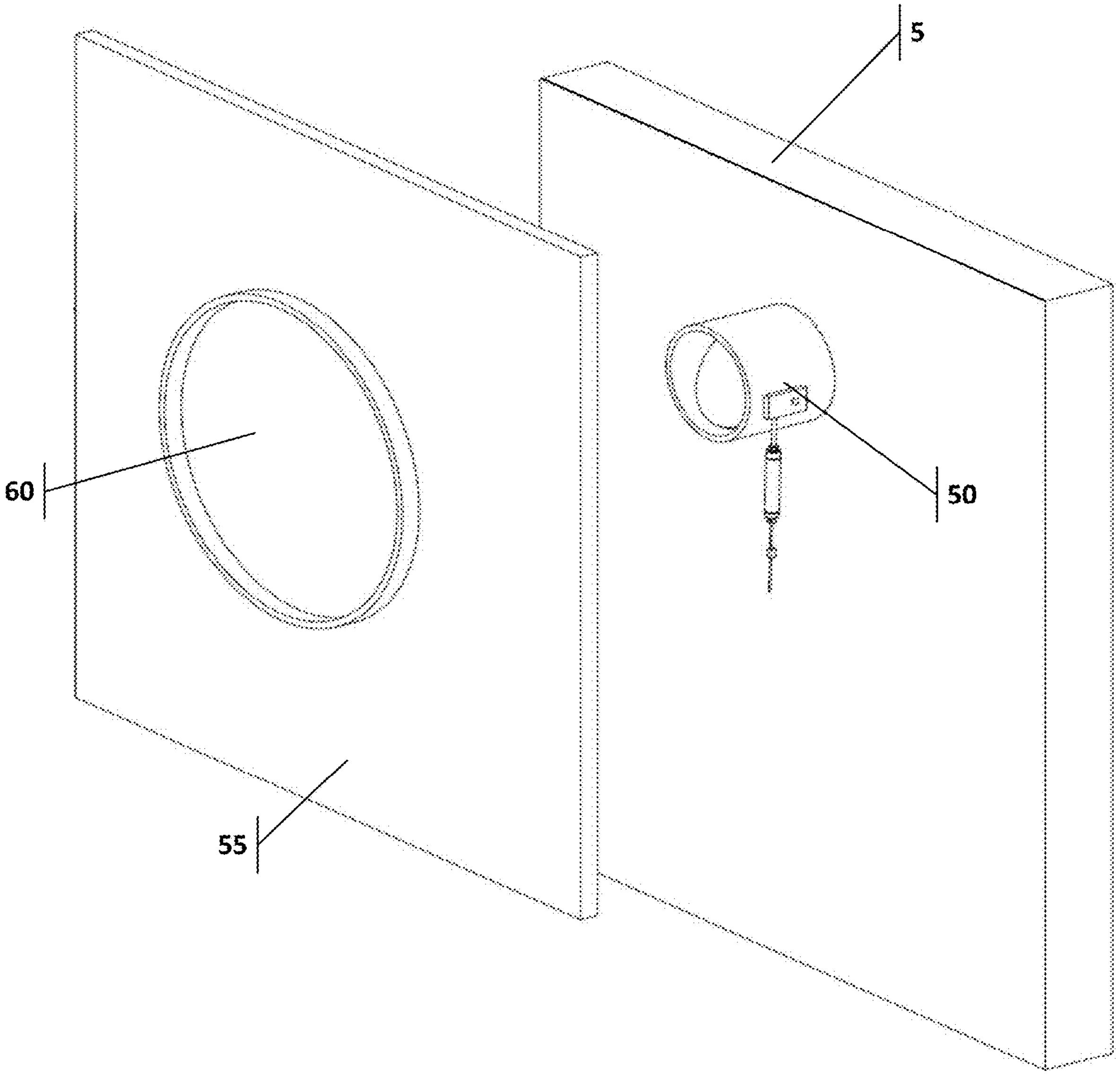
FIG. 4A is an isometric view of a pressure relief/exhaust valve and an active panel absorber mounted to a chamber wall to reduce LFN.
Figure 4B:
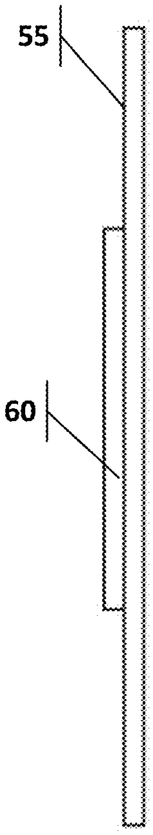
FIG. 4B is a side view of the active panel shown in FIG. 4A.
Figure 4C:
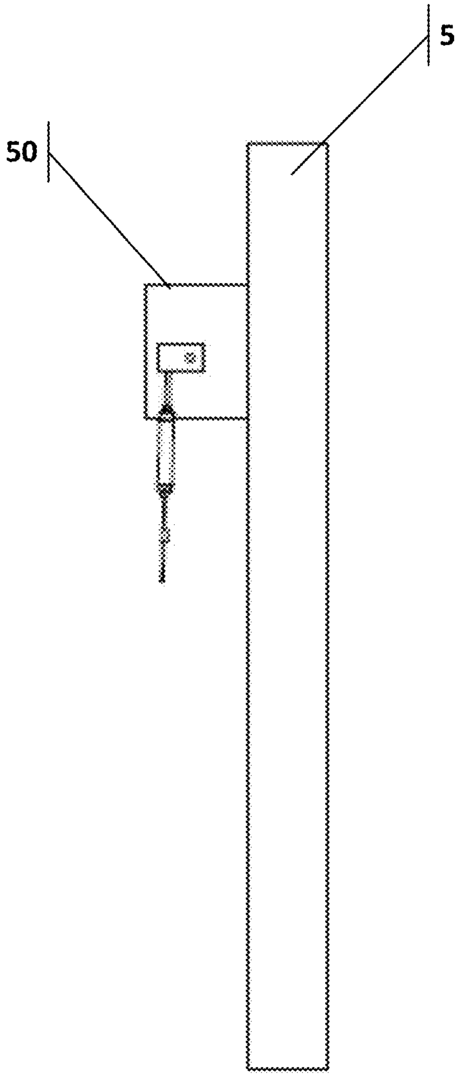
FIG. 4C is a top view of the pressure relief/exhaust valve mounted to the chamber wall shown in FIG. 4A.
Figure 4D:
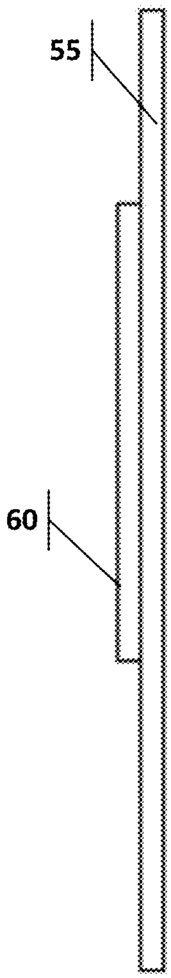
FIG. 4D is a top view of the active panel shown in FIG. 4A.
Figure 4E:
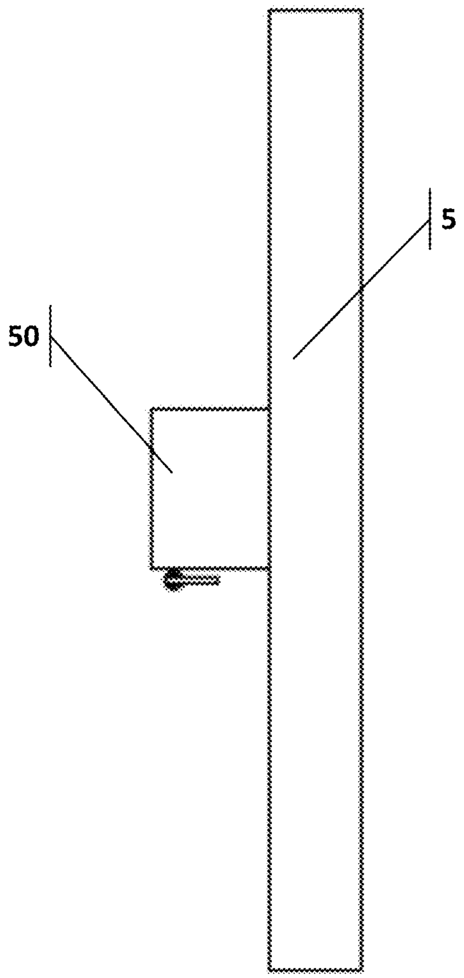
FIG. 4E is a side view of the pressure relief/exhaust valve mounted to the chamber wall shown in FIG. 4A.
Figure 4F:
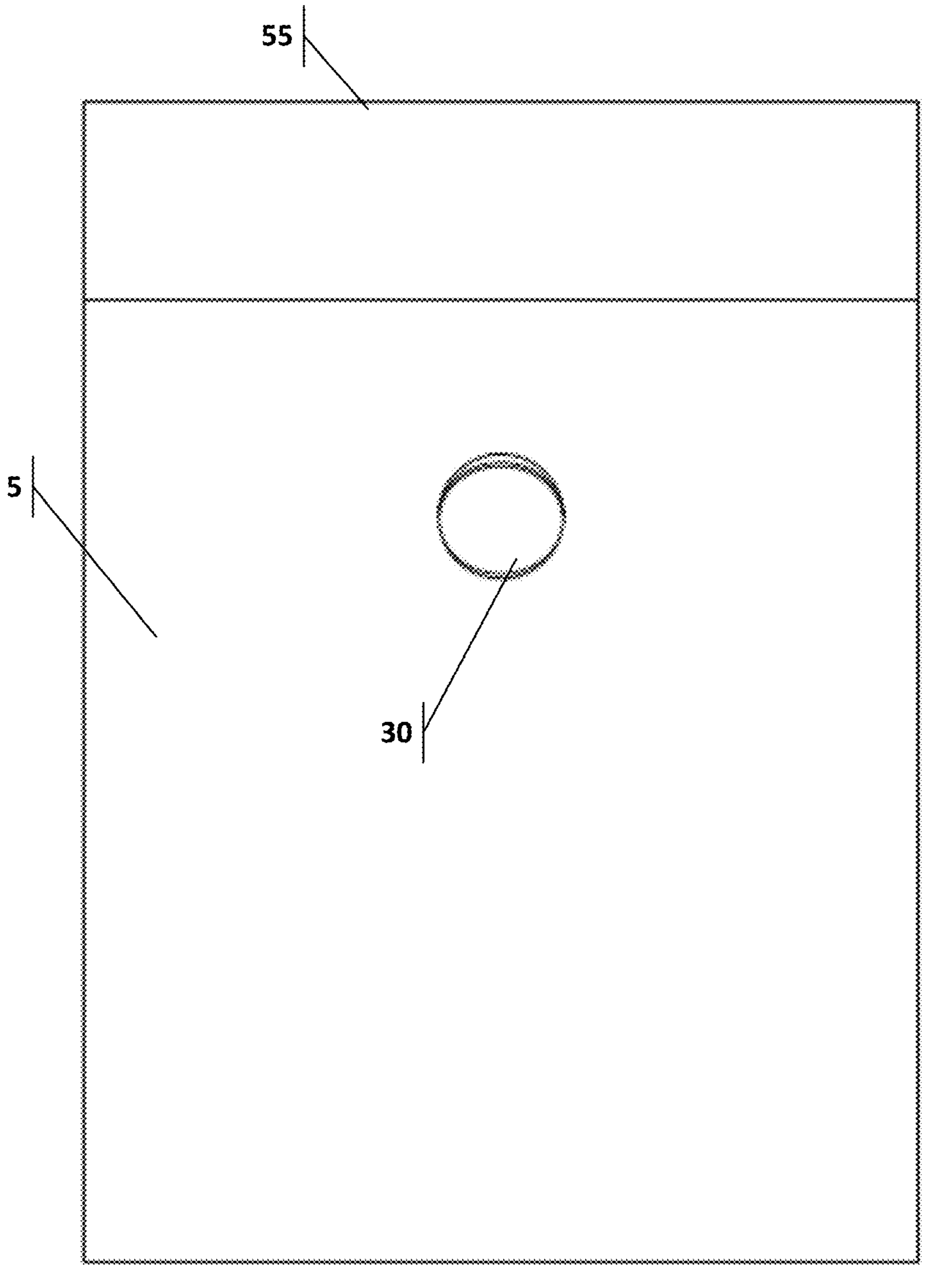
FIG. 4F is a back view of the structure of FIG. 4A.
Figure 5A:
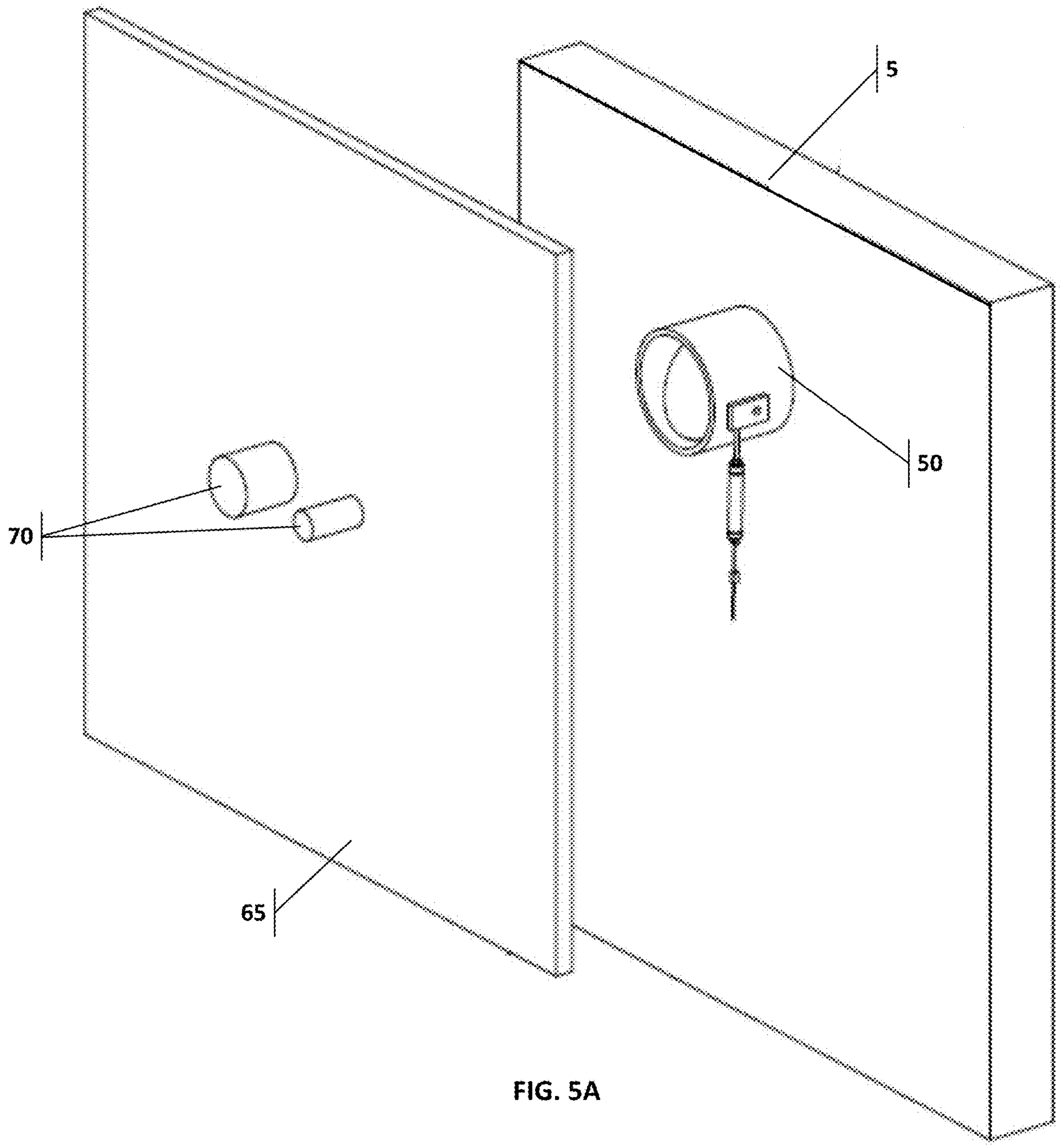
FIG. 5A is an isometric view of a pressure relief/exhaust valve and a panel tuned for LFN absorption mounted to a chamber wall.
Figure 5B:
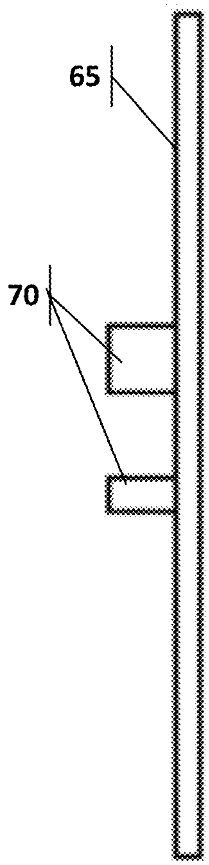
FIG. 5B is a side view of the panel shown in FIG. 5A.
Figure 5C:
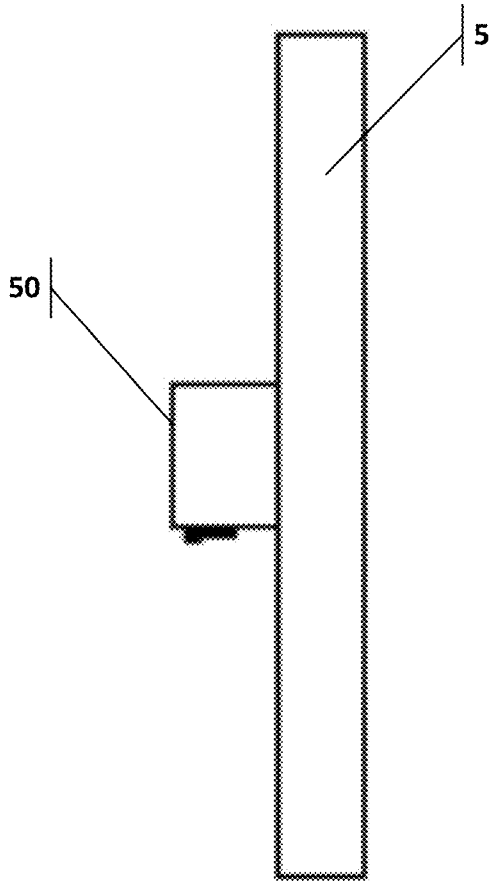
FIG. 5C is a top view of the pressure relief/exhaust valve mounted to the chamber wall shown in FIG. 5A.
Figure 5D:
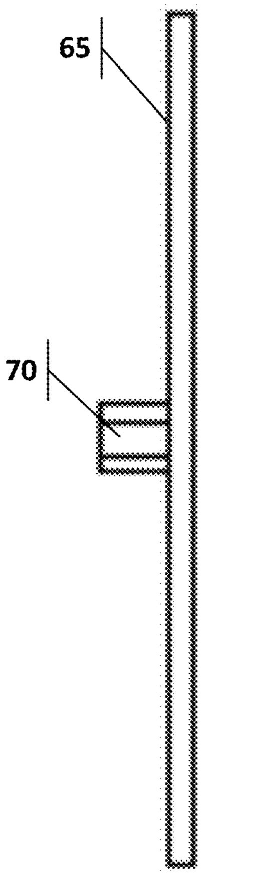
FIG. 5D is a top view of the panel shown in FIG. 5A.
Figure 5E:
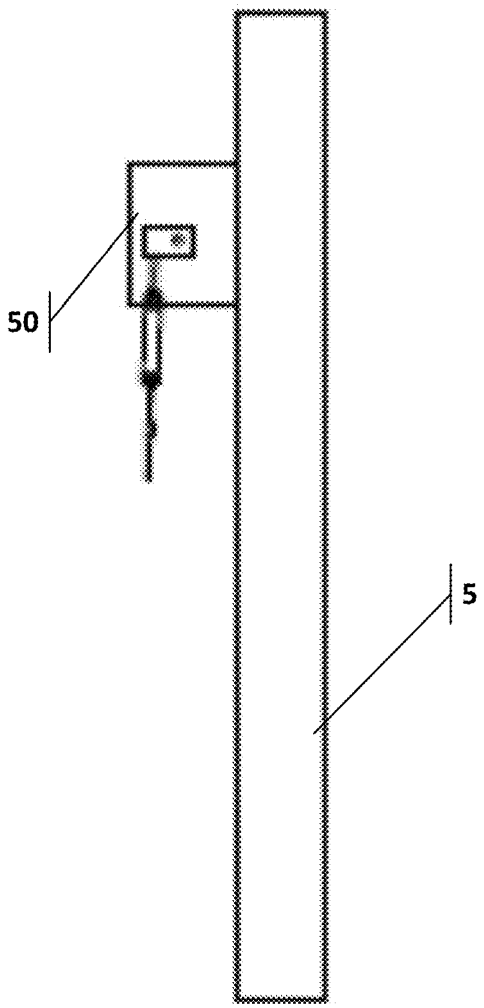
FIG. 5E is a side view of the pressure relief/exhaust valve mounted to the chamber wall shown in FIG. 5A.
Figure 5F:
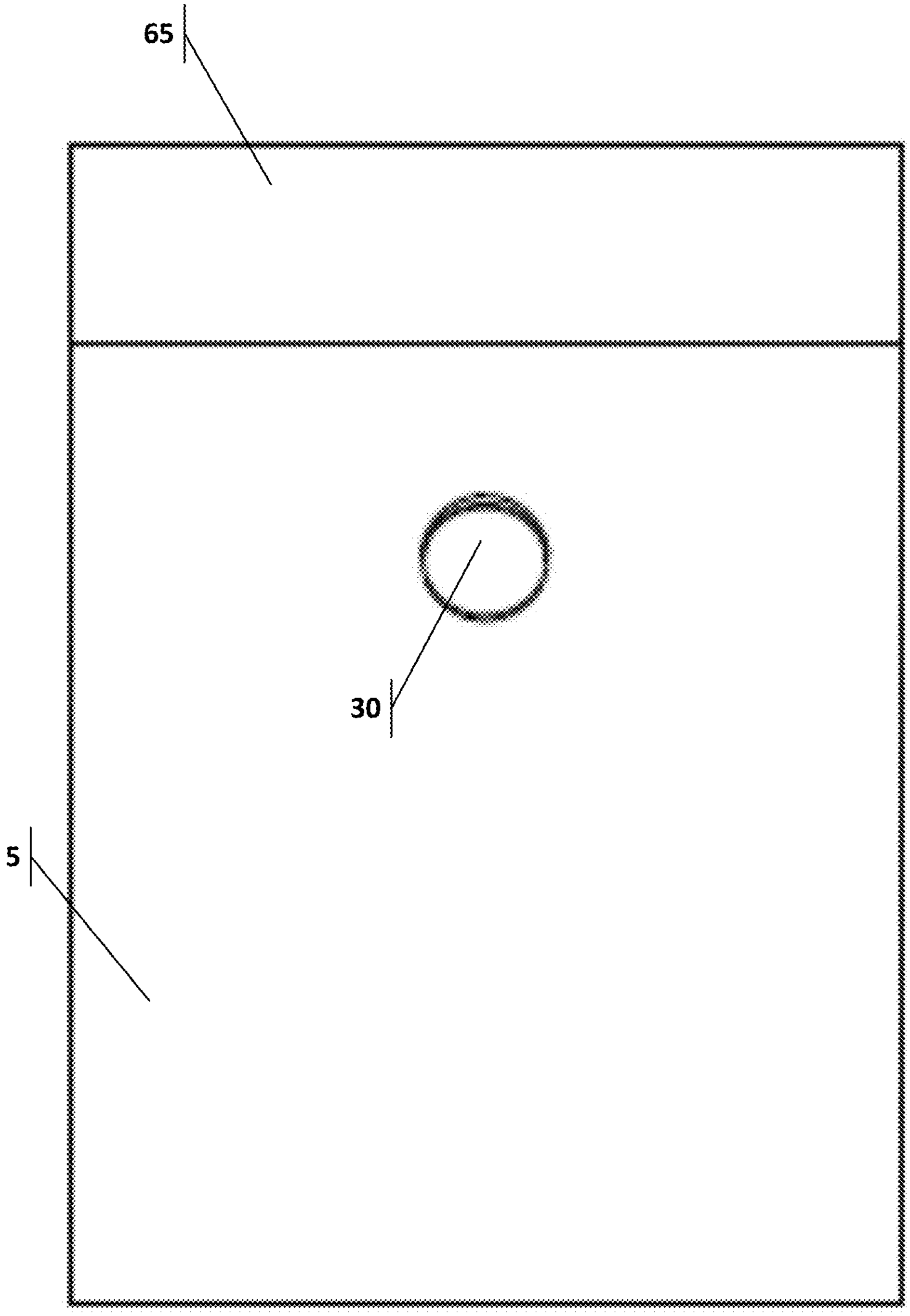
FIG. 5F is a back view of the structure of FIG. 5A.

FIGS. 2A-2E accomplishes the initial pressure bleed through an additional chamber pressure relief port 30. When the valve 10 is first opened the pressure can escape through port 35 (arrow 35.1) and perpendicular to the port 35 (arrow 35.2) through a pressure relief slit 35. The additional air escape route (35.2) depressurizes the chamber quickly enough such that when the valve continues to open LFN formation is mitigated. The pressure relief slit 35 is positioned adjacent to the valve blade/flap 15 such that the valve blade/flap 15 directs the air flow through the pressure relief slit 35 during the initial opening of the pressure relief/exhaust valve 10 (shown in FIGS. 2F and 2G). The port 35 may be used with or without an actuator speed controller 25 implement a variable opening speed as discussed above.

FIGS. 3A-3D accomplishes the initial pressure bleed through a secondary pressure relief/exhaust valve 40 with a second actuator 42. The secondary pressure relief/exhaust valve 40 may be actuated before the pressure relief/exhaust valve 10, such that the valve 10 does not emit LFN as it opens. The pressure relief/exhaust valve 10 handles the bulk of the air flow release, while the secondary pressure relief/exhaust valve 40 handles a smaller portion—preferably the pressure relief/exhaust valve 10 has a maximum airflow rate at least twice that of the secondary pressure relief/exhaust valve 40. The secondary pressure relief/exhaust valve 40 may be used in combination with the pressure relief port 30 and pressure relief slit 35, and also with the actuator speed controller 25 described above to provide more granular control of the pressure release.

FIGS. 4A-4F disclose an actively controlled panel 55 to mitigate LFN. The panel 55 is connected to a panel actuator 60, which acts like a speaker voice coil. The panel 55 is positioned adjacent to the pressure relief/exhaust valve 10. By measuring the frequency of the expected LFN with a microphone (either in real time or averaged over time), the panel actuator 60 can be operated at the same frequency, vibrating the panel 55 to cause destructive interference and canceling the LFN. This is similar to noise cancellation in headphones. To further improve LFN mitigation in this embodiment, a secondary pressure relief/exhaust valve 40, pressure relief slit 35 and actuator speed controller 25 may be used as described above.

FIGS. 5A-5F disclose a passively controlled panel 65 to mitigate LFN. The panel 65 is connected to panel springs and dampers 70 tuned to absorb much of the LFN. The panel springs and dampers 70 may be adjustable to change the frequency the tuned LFN panel 65 will absorb. To further improve LFN mitigation in this embodiment, a secondary pressure relief/exhaust valve 40, pressure relief port 30 and actuator speed controller 25 may be used as described above.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An improvement for mitigating low frequency noise (LFN) in a wave making apparatus comprising a chamber (120) constructed to release water into a pool, the chamber (120) comprising a pressure relief or exhaust valve (10) having a valve blade or flap (15) constructed to regulate air flow from an interior of the chamber (120) to an exterior of the chamber (120), the improvement comprising:

an actuator (20) connected to the pressure relief or exhaust valve (10);

an actuator speed controller (25) connected to the actuator (20), wherein the actuator speed controller (25) comprises a first opening speed (26) and a second opening speed (27);

wherein:

the first opening speed is less than the second opening speed;

the first opening speed is implemented at an initial opening of the pressure relief or exhaust valve (10) for a period; and the period is selected to mitigate formation of LFN caused by the air flow through the pressure relief or exhaust valve (10);

the actuator (20) comprises a valve blade or flap stroke percentage (VS %);

the first opening speed is defined by $(\Delta VS\ \%)_1$/second; and the second opening speed is defined by $(\Delta VS\ \%)_2$/second.

2. An improvement for mitigating low frequency noise (LFN) in a wave making apparatus comprising a chamber (120) constructed to release water into a pool, the chamber (120) comprising a pressure relief or exhaust valve (10) having a valve blade or flap (15) constructed to regulate air flow from an interior of the chamber (120) to an exterior of the chamber (120), the improvement comprising:

an actuator (20) connected to the pressure relief or exhaust valve (10);

an actuator speed controller (25) connected to the actuator (20), wherein the actuator speed controller (25) comprises a first opening speed (26) and a second opening speed (27);

wherein:

the first opening speed is less than the second opening speed;

the first opening speed is implemented at an initial opening of the pressure relief or exhaust valve (10) for a period; and the period is selected to mitigate formation of LFN caused by the air flow through the pressure relief or exhaust valve (10);

the pressure relief or exhaust valve (10) comprises a pressure relief port (30) providing a conduit for the air flow in a first direction (35.1);

the port (30) comprising a pressure relief slit (35) allowing airflow in a second direction (35.2) perpendicular to the first direction;

the pressure relief slit (35) positioned adjacent to the valve blade or flap (15) such that the valve blade or flap (15) directs the air flow through the pressure relief slit (35) during the initial opening of the pressure relief or exhaust valve (10).

3. An improvement for mitigating low frequency noise (LFN) in a wave making apparatus comprising a chamber (120) constructed to release water into a pool, the chamber (120) comprising a pressure relief or exhaust valve (10) having a valve blade or flap (15) constructed to regulate air flow from an interior of the chamber (120) to an exterior of the chamber (120), the improvement comprising:

an actuator (20) connected to the pressure relief or exhaust valve (10);

an actuator speed controller (25) connected to the actuator (20), wherein the actuator speed controller (25) comprises a first opening speed (26) and a second opening speed (27);

a secondary pressure relief valve (40) constructed to regulate a second air flow from the interior of the chamber (120) to the exterior of the chamber (120);

a second actuator (42) connected to the secondary pressure relief valve (40);

the actuator speed controller (25) connected to the second actuator (42);

wherein:

the first opening speed is less than the second opening speed;

the first opening speed is implemented at an initial opening of the pressure relief or exhaust valve (10) for a period; and the period is selected to mitigate formation of LFN caused by the air flow through the pressure relief or exhaust valve (10);

the actuator speed controller (25) begins opening the secondary pressure relief valve (40) before the actuator speed controller (25) begins opening the pressure relief or exhaust valve (10).

4. The improvement of claim 3, wherein:

the pressure relief or exhaust valve (10) comprises a first maximum air flow rate; and the secondary pressure relief valve (40) comprises a second maximum air flow rate that is less than half of the first maximum airflow rate.

5. An improvement for mitigating low frequency noise (LFN) in a wave making apparatus comprising a chamber (120) constructed to release water into a pool, the chamber (120) comprising a pressure relief or exhaust valve (10) having a valve blade or flap (15) constructed to regulate air flow from an interior of the chamber (120) to an exterior of the chamber (120), the improvement comprising:

a pressure relief port (30) providing a conduit for the air flow in a first direction;

the port (30) comprising a pressure relief slit (35) allowing airflow in a second direction perpendicular to the first direction; and the pressure relief slit (35) positioned adjacent to the valve blade or flap (15) such that the valve blade or flap (15) directs a sufficient portion of the air flow through the pressure relief slit (35) during an initial opening of the pressure relief or exhaust valve (10) to mitigate formation of LFN.

6. The improvement of claim 5, further comprising:

an actuator (20) connected to the pressure relief or exhaust valve (10);

an actuator speed controller (25) connected to the actuator (20), wherein the actuator speed controller (25) comprises a first opening speed and a second opening speed;

wherein:

the first opening speed is less than the second opening speed;

the first opening speed is implemented at the initial opening of the pressure relief or exhaust valve (10) for a period; and the period is selected to further mitigate the formation of LFN caused by the air flow through the pressure relief or exhaust valve (10).

7. The improvement of claim 6, wherein:

the actuator (20) comprises a valve blade or flap stroke percentage (VS %);

the first opening speed is defined by $(\Delta VS\ \%)_1$/second; and the second opening speed is defined by $(\Delta VS\ \%)_2$/second.

8. The improvement of claim 5, further comprising:

a secondary pressure relief valve (40) constructed to regulate a second air flow from the interior of the chamber (120) to the exterior of the chamber (120);

an actuator (20) connected to the pressure relief or exhaust valve (10);

a second actuator (42) connected to the secondary pressure relief valve (40);

an actuator speed controller (25) connected to the actuator (20) and second actuator (42);

wherein the actuator speed controller (25) begins opening the secondary pressure relief valve (40) before the actuator speed controller (25) begins opening the pressure relief or exhaust valve (10).

9. The improvement of claim 8, wherein:

the pressure relief or exhaust valve (10) comprises a first maximum air flow rate; and the secondary pressure relief valve (40) comprises a second maximum air flow rate that is less than half of the first maximum airflow rate.

10. An improvement for mitigating low frequency noise (LFN) in a wave making apparatus comprising a chamber (120) constructed to release water into a pool, the chamber (120) comprising a pressure relief or exhaust valve (10) having a valve blade or flap (15) constructed to regulate air flow from an interior of the chamber (120) to an exterior of the chamber (120), the improvement comprising:

a secondary pressure relief valve (40) constructed to regulate a second air flow from the interior of the chamber (120) to the exterior of the chamber (120);

an actuator (20) connected to the pressure relief or exhaust valve (10);

a second actuator (42) connected to the secondary pressure relief valve (40);

an actuator speed controller (25) connected to the actuator (20) and second actuator (42);

wherein the actuator speed controller (25) begins opening the secondary pressure relief valve (40) before the actuator speed controller (25) begins opening the pressure relief or exhaust valve (10), to mitigate formation of LFN.

11. The improvement of claim 10, further comprising:

a pressure relief port (30) providing a conduit for the air flow in a first direction;

the port (30) comprising a pressure relief slit (35) allowing airflow in a second direction perpendicular to the first direction; and the pressure relief slit (35) positioned adjacent to the valve blade or flap (15) such that the valve blade or flap (15) directs a sufficient portion of the air flow through the pressure relief slit (35) during an initial opening of the pressure relief or exhaust valve (10) to further mitigate the formation of LFN.

12. The improvement of claim 10, wherein:

the actuator speed controller (25) comprises a first opening speed and a second opening speed;

the first opening speed is less than the second opening speed;

the first opening speed is implemented at an initial opening of the pressure relief or exhaust valve (10) for a period; and the period is selected to further mitigate the formation of LFN caused by the air flow through the pressure relief or exhaust valve (10).

13. The improvement of claim 12, wherein:

the actuator (20) comprises a valve blade or flap stroke percentage (VS %);

the first opening speed is defined by $(\Delta VS\ \%)_1$/second; and the second opening speed is defined by $(\Delta VS\ \%)_2$/second.

* * * * *